United States Patent [19]

Katsumoto et al.

[11] Patent Number: 4,715,655
[45] Date of Patent: Dec. 29, 1987

[54] RECLINING ANGLE ADJUSTMENT DEVICE

[75] Inventors: Naoaki Katsumoto, Fujisawa; Toshihito Miyagawa, Toyota, both of Japan

[73] Assignees: Shiroki Kinzoku Kogyo Kabushiki Kaisha, Fujisawa; Toyota Jidosha Kabushiki Kaisha, Toyota, both of Japan

[21] Appl. No.: 801,961

[22] Filed: Nov. 26, 1985

[30] Foreign Application Priority Data

Nov. 26, 1984 [JP] Japan .................. 59-179597

[51] Int. Cl.[4] .................. E05D 11/10; B60N 1/02
[52] U.S. Cl. .................. 297/362; 188/82.2; 297/355
[58] Field of Search .............. 297/361, 362, 366, 354, 297/555; 188/83, 82.2

[56] References Cited

U.S. PATENT DOCUMENTS

| 3,343,872 | 9/1967 | Werner et al. | 297/362 |
| 3,976,327 | 8/1976 | Wirtz et al. | 297/366 |
| 4,113,308 | 9/1978 | Werner et al. | 297/362 |
| 4,457,557 | 7/1984 | Une | 297/362 |

FOREIGN PATENT DOCUMENTS

| 146726 | 9/1983 | Japan | 188/82.2 |
| 2059496 | 4/1981 | United Kingdom | 297/362 |

Primary Examiner—James T. McCall
Attorney, Agent, or Firm—Finnegan, Henderson, Farabow, Garrett & Dunner

[57] ABSTRACT

A reclining angle adjustment device includes a brake mechanism mounted on a control handle shaft for transmitting angular movement of a control handle to an angularly movable shaft, a stopper arm rotatably mounted on the angularly movable shaft and angularly movable by a driven member of a transmission mechanism, and stoppers for limiting angular movement of the stopper arm to determine a range of fine reclining angle adjustment.

4 Claims, 12 Drawing Figures

RECLINING ANGLE ADJUSTMENT DEVICE

BACKGROUND OF THE INVENTION

The present invention relates to a reclining angle adjustment device for adjusting the angle of inclination of the seat back of a reclining seat in an automobile, i.e., the reclining angle of the reclining seat.

One known reclining angle adjustment device comprises an intermediate gear plate having an outer gear, an upper arm having an inner gear meshing with the outer gear of the intermediate gear plate, an angularly movable shaft on which the intermediate gear plate and the upper arm are angularly movably mounted concentrically and eccentrically, respectively, thereon, a lower arm cooperating with a subplate in supporting the angularly movable shaft, a release lever for unlocking the intermediate gear plate from the lower arm for rough reclining angle adjustment, and a control handle for turning the angularly movable shaft through a transmission mechanism to effect fine reclining angle adjustment. The intermediate gear plate has a recess defined in an outer peripheral edge thereof, and the upper arm has a pin disposed in the recess. The upper arm can therefore be finely adjusted within a range between the front and rear edges of the recess which are engaged by the pin.

When the known reclining angle adjustment device is subject to vibration produced during travel of the automobile, for example, the inner gear tends to vibrate with respect to the outer gear for thereby allowing the angularly movable shaft to be temporarily rotated freely with the control handle. The seat back is caused to be tilted and hence the reclining angle thereof varies with time.

SUMMARY OF THE INVENTION

It is an object of the present invention to provide a reclining angle adjustment device for preventing the reclining angle of a seat back from varying with time.

Another object of the present invention is to provide a reclining angle adjustment device having a relatively simple structure for preventing an angularly movable shaft from being rotated about its own axis.

Still another object of the present invention is to provide a reclining angle adjustment device capable of preventing an angularly movable shaft from being rotated about its own axis without impairing a rough reclining angle adjustment capability.

According to the present invention, a reclining angle adjustment device includes an intermediate gear plate having an outer gear, an upper arm having an inner gear meshing with the outer gear of the intermediate gear plate, an angularly movable shaft on which the intermediate gear plate and the upper arm are angularly movably mounted concentrically and eccentrically, respectively, thereon, a subplate, a lower arm cooperating with the subplate in supporting the angularly movable shaft, a release lever for unlocking the intermediate gear plate from the lower arm for rough reclining angle adjustment, a handle shaft rotatably mounted on the lower arm, a transmission mechanism having driver and driven members, the driver member being mounted on the handle shaft, a control handle mounted on the handle shaft for turning the angularly movable shaft through the transmission mechanism to effect fine reclining angle adjustment, a brake mechanism mounted on the handle shaft for transmitting angular movement of the control handle to the angularly movable shaft, a stopper arm rotatably mounted on the angularly movable shaft and angularly movable by the driven member of the transmission mechanism, and means for limiting angular movement of the stopper arm to determine a range of fine reclining angle adjustment.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
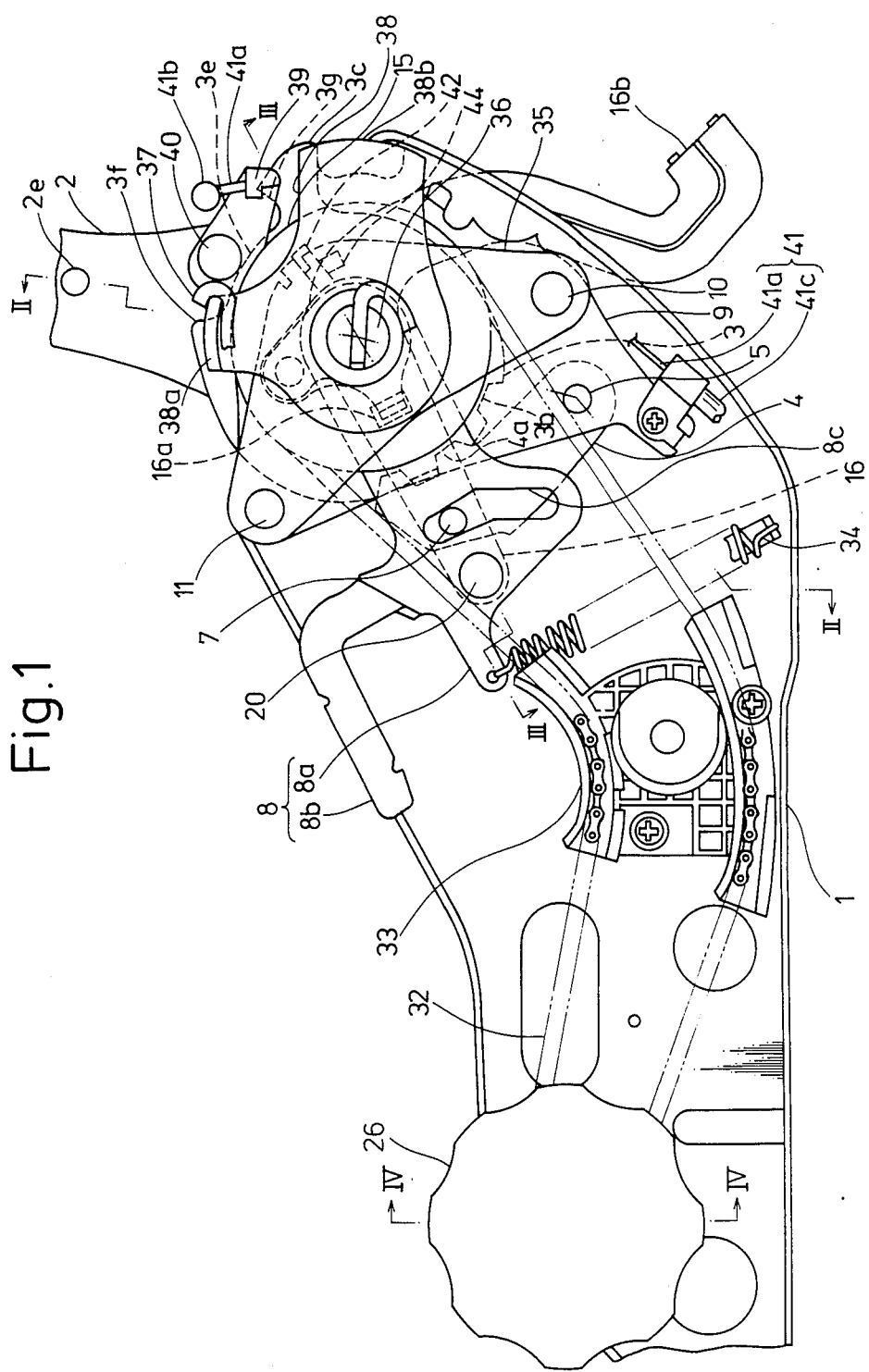
FIG. 1 is a side elevational view of a reclining angle adjustment device according to the present invention.
Figure 2:
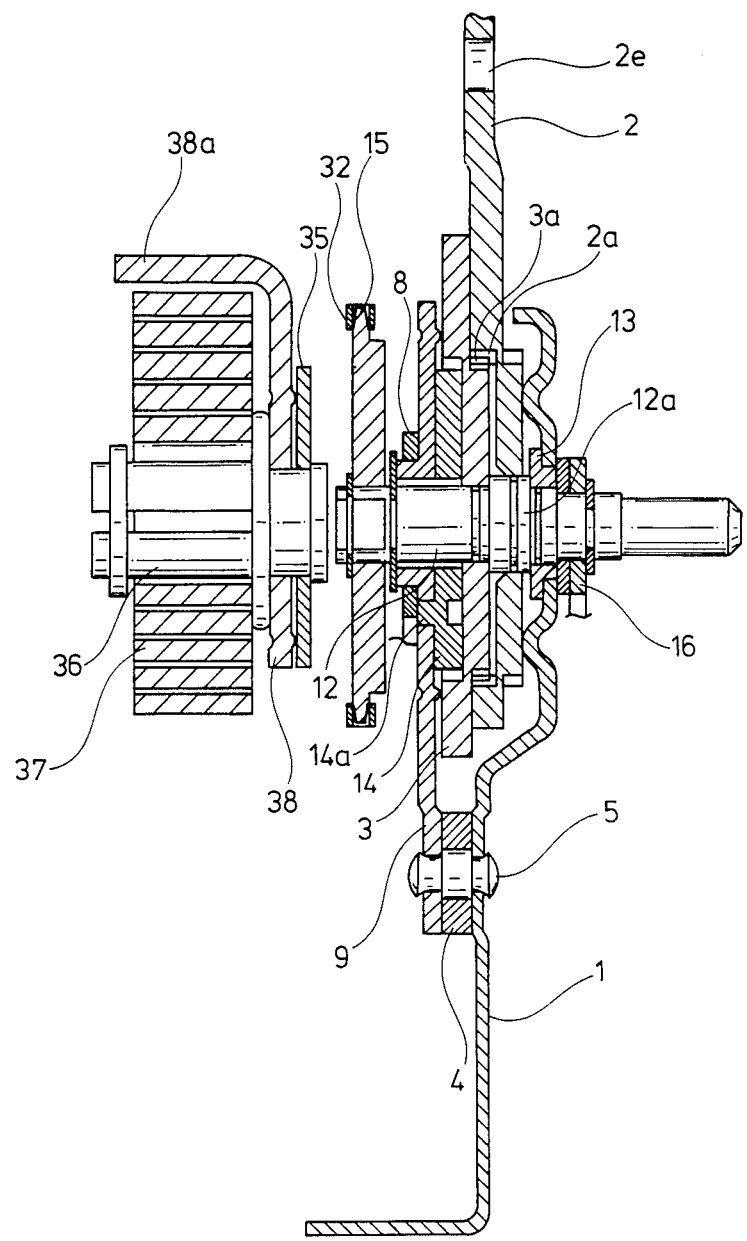
FIG. 2 is a cross-sectional view taken along line II—II of FIG. 1.
Figure 3:
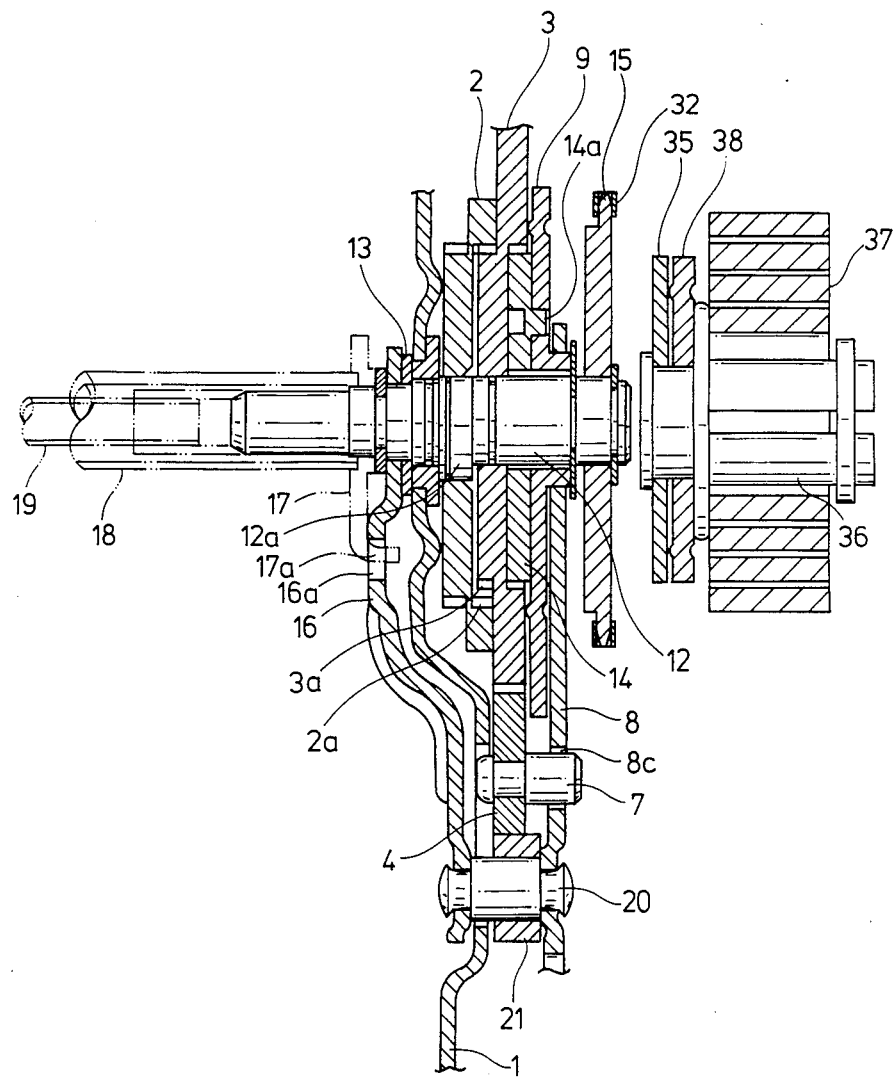
FIG. 3 is a cross-sectional view taken along line III—III of FIG. 1.

FIGS. 1 through 7 show a reclining angle adjustment device having lock mechanisms disposed respectively on the outer and inner sides of a reclining seat. Only the lock mechanism on the outer side is shown as the lock mechanism in the inner side is of the same construction.

The reclining angle adjustment device includes a lower arm 1 fixed as by screws to the seat cushion frame (not shown) of a reclining seat, and an upper arm 2 fixed as by screws to the seat back frame (not shown) of the reclining seat. The upper arm 2 has an inner gear 2a embossed on a side thereof as by precision pressing. The upper arm 2 has circular holes 2e defined in an upper portion thereof as attachment holes for passage therethrough of the screws toward the seat back frame. An intermediate gear plate 3 is disposed adjacent to the upper arm 2 and has an outer gear 3a embossed as by precision pressing on a side thereof facing the inner gear 2a of the upper arm 2. The intermediate gear plate 3 also has a rack 3b on an outer edge thereof. In the illustrated embodiment, the rack 3b is composed of a first tooth for holding the seat back in an intermediate position and a second tooth for holding the seat back in a rearwardly tilted position. However, the rack 3b may be composed of three or more teeth. The number of teeth of the inner gear 2a is selected to be at least one greater than the number of teeth of the outer gear 3a.

A pawl 4 is pivotally mounted on the lower arm 1 by a stepped pin 5 and has locking teeth 4a for engaging the rack 3b of the intermediate gear plate 3. A pin 7 is mounted on the pawl 4 near the locking teeth 4a and projects in a direction away from the lower arm 1, the pin 7 being inserted in a cam slot 8c defined in an intermediate portion 8a of a release lever 8. A subplate 9 is positioned more closely than the release lever 8 to the lower arm 1. The subplate 9 has attachment holes corresponding in position to the stepped pin 5 and stepped pins 10, 11, and is secured by these pins through the attachment holes to the lower arm 1 to prevent the upper arm 2, the intermediate gear plate 3, and the pawl 4 from being disassembled. An angularly movable shaft 12 includes an eccentric portion 12a disposed partially on a concentric portion thereof.

For assembly, the concentric portion of the angularly movable shaft 12 is angularly movably inserted through a bushing 13 of the lower arm 1, a central hole defined in the intermediate gear plate 3 in concentric relation to the outer gear 3a, the subplate 9 on which the release lever 8 is angularly movably mounted, and a spacer 14 fixed to the subplate 9. The eccentric portion 12a of the angularly movable shaft 12 is angularly movably inserted through a hole defined in the upper arm 2 in concentric relation to the inner gear 2a. A sprocket 15 is mounted on one end of the concentric portion of the angularly movable shaft 12 for angular movement therewith. Thus, the upper arm 2 and the intermediate gear plate 3 are angularly movably mounted respectively on the eccentric portion 12a and the concentric portion of the angularly movable shaft 12, and the inner gear 2a and the outer gear 3a are held in mesh with each other, thereby providing a planetary gear mechanism.

A release arm plate 16 is angularly movably mounted on the concentric portion of the angularly movable shaft 12 and has an extension 16b extending downwardly to the right in FIG. 1 to serve as a walk-in pedal. The release arm plate 16 also has in its intermediate portion a hole 16a in which there is fitted a hook 17a of a hook plate 17 fixed to a connecting pipe 18 for rough adjustment of the reclining angle of the reclining seat. The connecting pipe 18 serves to transmit the motion of the release lever 8 to the release lever of the identical lock mechanism disposed on the inner side of the reclining seat. The hook 17a has a width selected to be smaller than the width of the hole 16a in the release arm plate 16 in order to take up the difference between locking positions of the lock mechanisms on the outer and inner sides, thus preventing the reclining seat back from being partly locked. A connecting bar 19 for fine adjustment of the reclining angle is connected to the angularly movable shaft 12 for transmitting the motion of the angularly movable shaft 12 to the angularly movable shaft of the inner lock mechanism. The release arm plate 16 has its distal end secured by a stepped pin 20 to the intermediate portion 8a of the release lever 8. A roller 21 is fitted over the stepped pin 20 and held against the back of the pawl 4 to maintain the locking teeth 4a of the pawl 4 and the rack 3b of the intermediate gear plate 3 in reliable mesh with each other.

Figure 4:
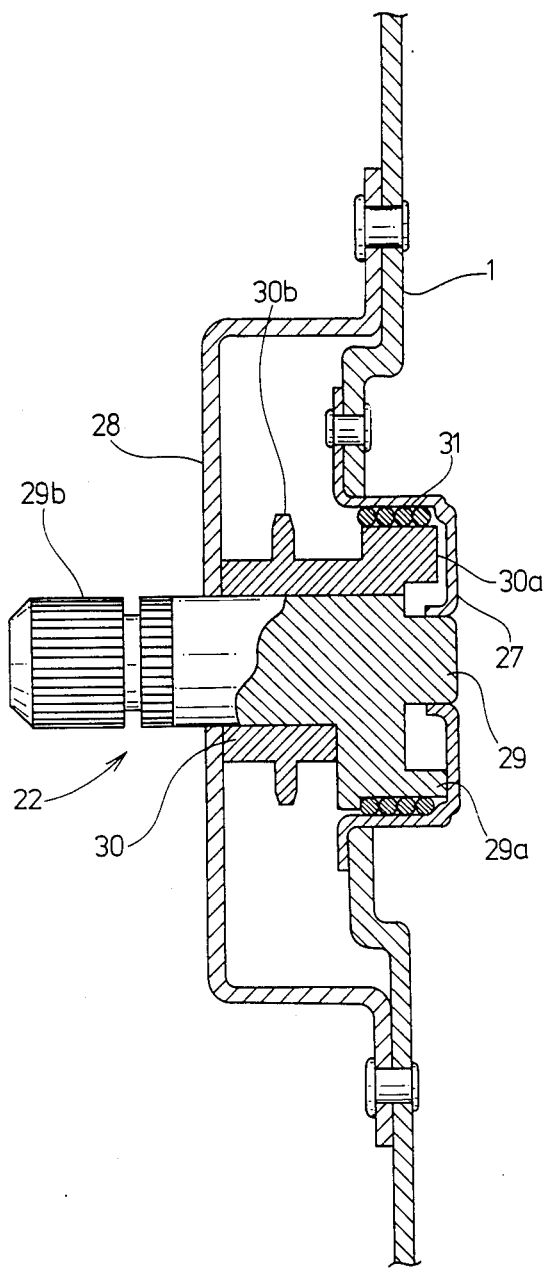
FIG. 4 is a cross-sectional view taken along line IV—IV of FIG. 1.
Figure 5:
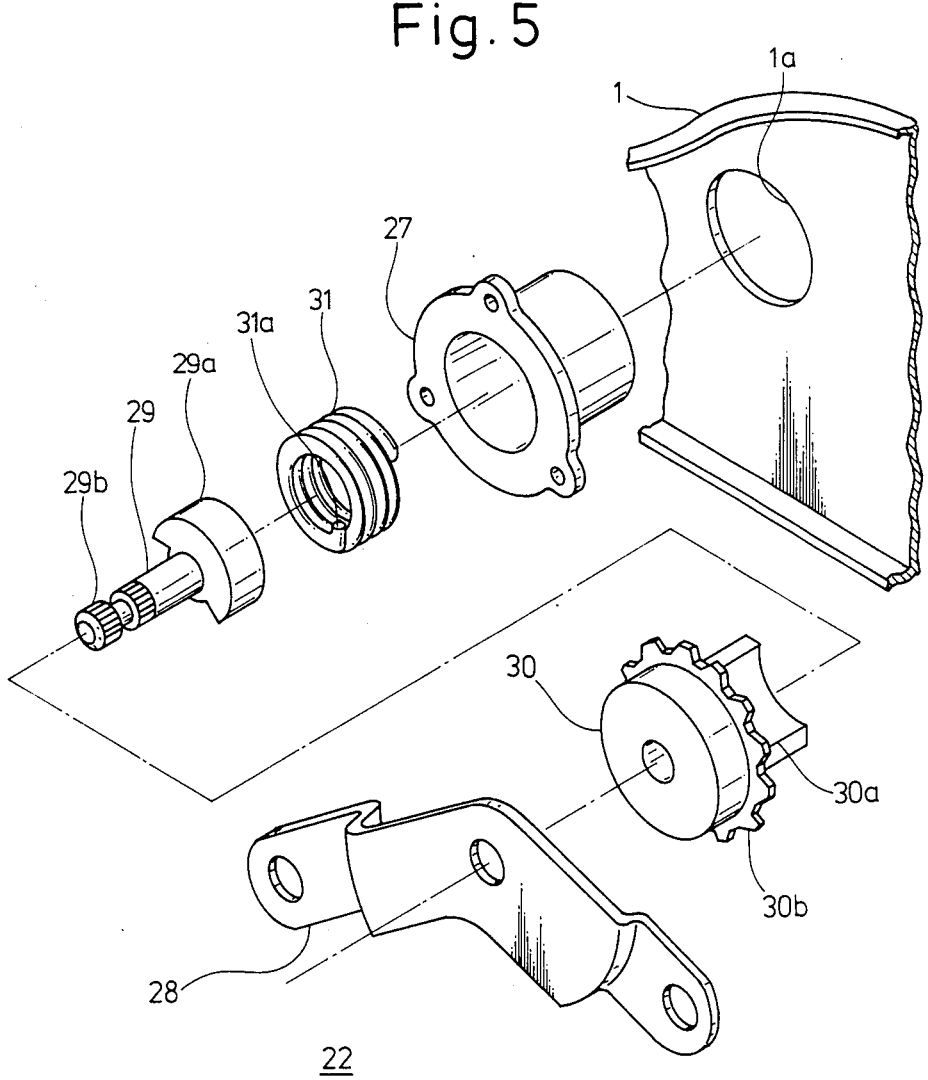
FIG. 5 is an exploded perspective view of a brake mechanism.

As better shown in FIGS. 4 and 5, a brake mechanism 22 is mounted on the lower arm 1. The brake mechanism 22 includes a handle shaft 29 with a control handle 26 (FIG. 1) mounted on one end thereof.

The brake mechanism 22 has a stopper case 27 fitted in a hole 1a in the lower arm 1 and riveted to the lower arm 1, and a cover bracket 28 riveted to the lower arm 1 in confronting relation to the cylindrical recess in the stopper case 27. The stopper case 27 and the cover bracket 28 have central holes in which the handle shaft 29 is inserted and angularly movably supported. The handle shaft 29 includes a core 29a with a recess defined therein, near the end of the handle shaft 29 close to the stopper case 27. The handle shaft 29 also has a serrated portion 29b near the end thereof close to the cover bracket 28 for supporting the control handle 26 thereon. A substantially cylindrical sprocket shaft 30 is fitted angularly movably over the handle shaft 29, and has on one end thereof a tongue 30a disposed in the recess of the core 29a. The sprocket shaft 30 also has a sprocket 30b on an outer peripheral surface thereof. A coil stopper spring 31 is disposed in the stopper case 27 and pressed against the inner wall surface of the stopper case 27. In its free state, the coil stopper spring 31 has an outside diameter slightly larger than the inside diameter of the stopper case 27. The stopper spring 31 has opposite ends bend radially inwardly into hooks 31a. The core 29a is disposed in the stopper spring 31 with the hooks 31a positioned in the recess of the core 29a, the tongue 30a being located between the hooks 31a.

A chain 32 is trained around the sprockets 30b, 15 and has intermediate portions guided by chain guides 33 mounted on the lower arm 1. A spring 34 acts between the release lever 8 and the lower arm 1 for normally urging the pawl 4 to turn in a direction to mesh with the intermediate plate 3. A pin bracket 35 is secured by the stepped pins 10, 11 to the lower arm 1, with a grooved pin 36 fixed to the pin bracket 35. A balancing spiral spring 37 has an inner end disposed in the longitudinal groove of the pin 36. A hook plate 38 is angularly movably mounted on the pin 36. The spiral spring 37 has an outer end held in engagement with a hook 38a of the hook plate 38. The hook plate 38 also has a bent portion 38b with its side held against a hook 3e of the intermediate gear plate 3.

A cable attachment bracket 39 is fixed to the upper arm 2 by a pin 40. When the upper arm 2 is tilted in a forward direction, the bracket 39 pulls the cable end 41b of an inner cable member 41a of a walk-in control cable 41 out of an outer cable sheath 41c.

Figure 6:
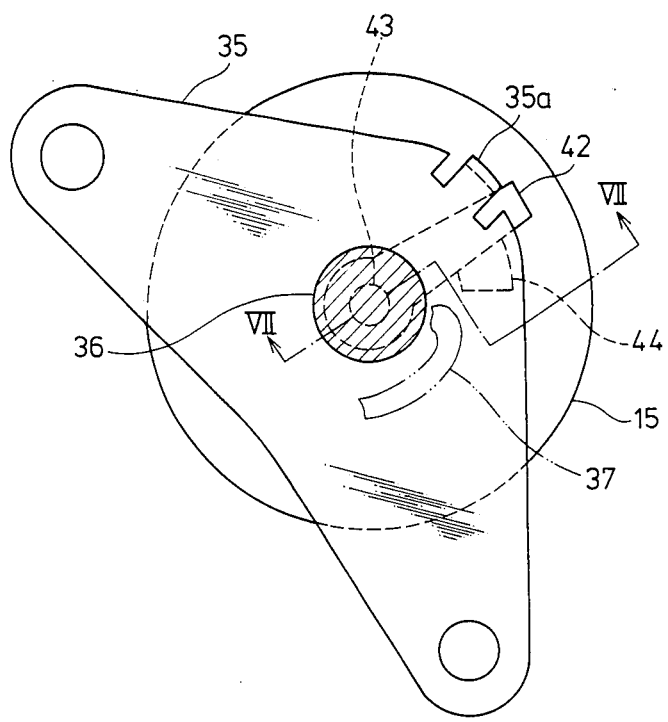
FIG. 6 is a side elevational view of a stopper mechanism of the reclining angle adjustment device of FIG. 1.
Figure 7:
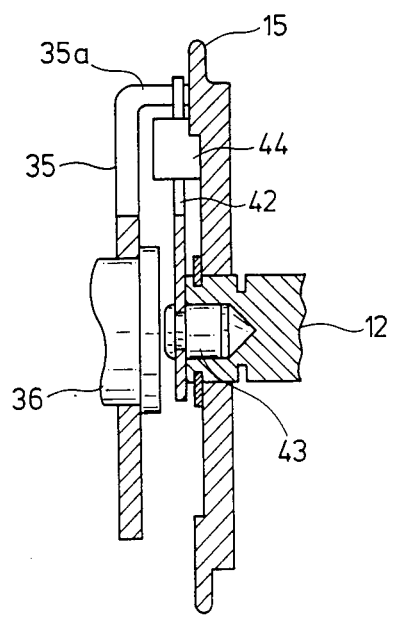
FIG. 7 is an enlarged cross-sectional view taken along line VII—VII of FIG. 6.

As shown in FIGS. 6 and 7, a stopper mechanism includes a stopper arm 42 having a pin 43 fixed to one end thereof and angularly movably inserted in a hole defined centrally in the end of the angularly movable shaft 12 which is close to the pin bracket 35. Therefore, the stopper arm 42 is supported for angularly movement about the pin 43. A stopper 44 is fixed to the sprocket 15 and projects into the path of angular movement of the stopper arm 42. Another stopper 35a is bent from the pin bracket 35 into the path of angular movement of the stopper arm 42.

The lock mechanism on the inner side of the reclining seat is substantially the same as that described above. However, since the release lever is operated only on the outer side of the reclining seat, the inner lock mechanism does not have the control portion 8b of the release lever 8, the extension 16b of the release arm plate 1, and the control handle 26.

Operation of the reclining angle adjustment device of the foregoing construction is as follows: In the position shown in FIG. 1, the locking teeth 4a of the pawl 4 mesh with the rack 3b of the intermediate gear plate 3 to lock the gear plate 3. Therefore, the outer gear 3a is fixed with respect to the lower arm 1. By turning the control handle 26, the handle shaft 29 and the core 29a integral therewith are turned. Right after they have turned, the hooks 31a of the stopper spring 31 abut against the ends of the recess of the core 29. Since the force applied from the handle shaft 29 tends to compress the stopper spring 31 to reduce its diameter, the frictional resistance between the stopper spring 31 and the stopper case 27 is reduced. The handle shaft 29 can smoothly be turned unobstructedly, and the sprocket shaft 30 is turned by the tongue 30a with the handle shaft 29. Therefore, the angularly movable shaft 12 is turned by the chain 32 to cause the upper arm 2 to turn at a prescribed speed-reduction ratio through the planetary gear mechanism. Accordingly, the reclining angle can be adjusted finely in the angular range between the front and rear ends 3f, 3g of the recess 3e of the intermediate gear plate 3.

For rough adjustment of the reclining angle, the control portion 8b of the release lever 8 is turned clockwise in FIG. 1 by the passenger seated on the reclining seat. The roller 21 is also turned clockwise in a direction to disengage from the pawl 4. (The lower arm 1 has arcuate holes defined therein to allow the pins 7, 20 to move therein for permitting the roller 21 to turn as described above.) The pin 7 in the cam slot 8c now moves toward the control handle 26. The locking teeth 4a are then brought out of mesh with the rack 3b of the intermediate gear plate 3, which is now unlocked. Thus, the reclining angle can now be roughly adjusted, or the seat back can be quickly tilted as desired. The lock mechanism on the inner side of the reclining seat operates in the same manner.

When the reclining angle adjustment device of the invention is subjected to forces tending to turn the shaft about its own axis due to vibrations, such forces act through the tongue 30a of the sprocket shaft 30 to expand the stopper spring 31 to increase its diameter, i.e., to increase the force with which the stopper spring 31 is pressed against the pinion case 27. As a consequence, the frictional force between the stopper spring 31 and the pinion case 27 is increased to prevent the angularly movable shaft 12 from being turned of its own accord.

Figure 9:
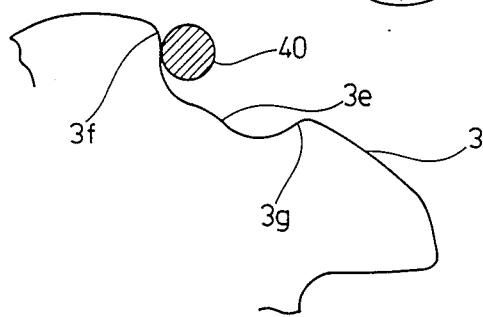
FIGS. 9 and 10 are schematic views illustrative of the manner in which a fine adjustment range is established by a conventional mechanism.
Figure 10:
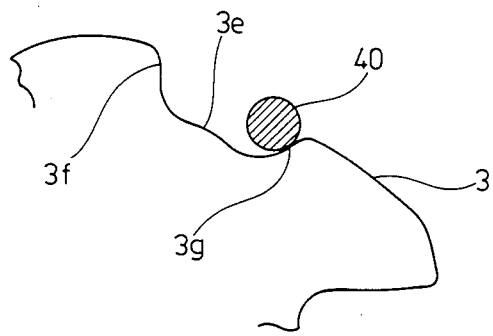

In a conventional reclining angle adjustment device, the range of fine reclining angle adjustment is determined between the front and rear ends 3f, 3g of the recess 3e in the intermediate gear plate 3 which are engageable with the pin 40, as shown in FIGS. 9 and 10. This arrangement however has the following disadvantages: When the control portion 8b of the release lever 8 is lifted to release the intermediate gear plate 3, the upper arm 2 and the intermediate gear plate 3 are turned in the same direction since the angularly movable shaft 12 is prevented by the brake mechanism 22 from being turned. The speed of angular movement of the upper arm 2 is slightly lower than the speed of angular movement of the intermediate gear plate 3. After the front end 3f of the recess 3e abuts against the pin 40 as shown in FIG. 9, the upper arm 2 cannot be tilted rearwardly. Likewise, after the front end 3f of the recess 3e abuts against the pin 40 as shown in FIG. 9, the upper arm 2 cannot be tilted rearwardly. As a consequence, rough reclining angle adjustment cannot be performed if the upper arm 2 and the intermediate gear plate 3 are held in a certain relative position prior to the rough reclining angle adjustment.

The above problem can be solved by the stopper mechanism illustrated in FIGS. 6 and 7. In the position of FIG. 6, the stoppers 35a, 44 are held against the opposite sides of the stopper arm 42, and the sprocket 15 cannot be turned counterclockwise from the illustrated position. When the sprocket 15 is turned clockwise, it is rotated through about 360 degrees, leaving the stopper arm 42, and then rotated again through about 360 degrees while pushing the stopper arm 42 with the stopper 44 engaging one side thereof. The sprocket 15 is stopped when the other side of the stopper arm 42 engages the stopper 35a. Therefore, fine adjustment of the reclining angle can be effected in the range in which the sprocket 15 can make about two rotations. Since the stopper mechanism does not limit the relative positional relationship between the upper arm 2 and the intermediate gear plate 3, rough reclining angle adjustment is possible regardless of such relative positional relationship. With the present invention, the spacing between the front and rear ends 3f, 3e of the recess 3 is sufficiently larger than that of the conventional device so that the pin 40 will not engage the front and rear edges 3f, 3e.

The control handle 26 can be prevented from being rotated about its own axis by the simple brake mehanism incorporated in the control handle assembly, with the result that the reclining angle will not vary with time. The range of fine reclining angle adjustment is determined by the stopper arm 42 which is rotated by the chain and sprocket transmission mechanism and limited in its rotation by the stoppers 35a, 44. Therefore, rough reclining angle adjustment can be performed irrespectively of the relative positional reationship between the upper arm 2 and the intermediate gear plate 3.

While the lock mechanisms have been described as being provided on the outer and inner sides of the reclining seat, only the outer lock mechanism may be provided and the reclining seat may only be hinged on the inner side thereof. The upper arm is shown as being remotely controlled by the chain and sprocket transmission mechanism. However, the upper arm may be remotely controlled by a belt transmission device composed of a belt and pulleys or a grooved belt and grooved pulleys, or other transmission devices. Although the stopper arm 42 is angularly movably mounted on the angularly movable shaft 12, the stopper arm 42 may be angularly movably attached to the grooved pin 36 or the pin bracket 35.

Figure 8A:
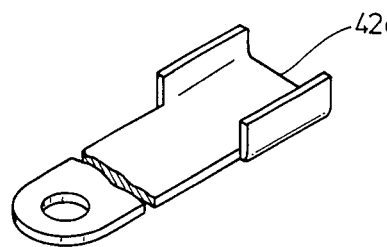
FIGS. 8(a) through 8(c) are perspective views of stopper arms according to modifications of the present invention.
Figure 8B:
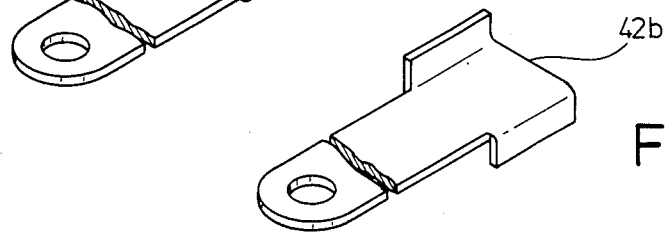
Figure 8C:
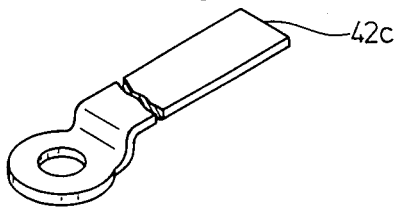

The stopper arm 42 is of a flat configuration in FIG. 7. FIGS. 8(a) through 8(c) illustrate various modified stopper arms. In FIG. 8(a), a stopper arm 42a is of a U-shaped cross section having a pair of spaced flanges projecting in one direction. A stopper arm 42b illustrated in FIG. 8(b) has a pair of spaced flanges projecting in opposite directions. According to still another modification shown in FIG. 8(c), a stopper arm 42c is in the form of a bent flat tongue. Where these modified stopper arms are employed, stoppers should be positioned for proper engagement therewith. The two stoppers may be provided on the pin bracket 35 to achieve a desired range of fine reclining angle adjustment. Alternatively, the stoppers may be separate from the pin bracket 35.

Although certain preferred embodiments have been shown and described, it should be understood that many changes and modifications may be made therein without departing from the scope of the appended claims.

What is claimed is:
1. A reclining angle adjustment device comprising:
an intermediate gear plate having an outer gear with a rack on an outer edge thereof;
an upper arm having an inner gear meshing with said outer gear of the intermediate gear plate;
an angularly movable shaft on which said intermediate gear plate and said upper arm are angularly movably mounted concentrically and eccentrically thereon, respectively;

a lower arm fixed to a subplate to hold said intermediate gear plate and upper arm between said lower arm and said subplate and in supporting relation to said angularly movable shaft;

a pawl pivotally mounted on said lower arm and having teeth for selective engagement with said rack of said intermediate gear plate;

a release lever rotatable mounted on said angularly movable shaft for releasing said rack of said intermediate gear plate from said pawl for rough reclining angle adjustment;

a handle shaft rotatably mounted on said lower arm;

a transmission mechanism having driver and driven members, said driver member being mounted on said handle shaft with said driven member being mounted on said angularly movable shaft;

a control handle mounted on said handle shaft for turning said angularly movable shaft through said transmission mechanism to effect fine reclining angle adjustment;

a stopper arm rotatively mounted on said angularly movable shaft and angularly movable by said driven member of the transmission mechanism over a limited path;

a brake mechanism mounted on said handle shaft for selectively preventing said handle shaft and said driver member from rotating to in turn prevent rotation of said driven member;

a first stopper provided in a pin bracket fixed to said lower arm for engaging said stopper arm to limit rotation thereof;

a second stopper provided on said driven member for rotation with said driven member, with said second stopper engaging said stopper arm during movement thereof by said driven member along said limited path; and said first stopper establishing a range of fine reclining angle adjustment defined by movement of said stopper arm between positions abutting said first stopper in opposite directions.

2. A reclining angle adjustment device according to claim 1, wherein said brake mechanism comprises a stopper case fixed to said lower arm adjacent to said handle shaft, a stopper coil spring disposed in said stopper case and held against the inner wall surface of the stopper case, said stopper coil having two hooks on opposite ends thereof, a core having a recess and disposed in said stopper coil spring with said two hooks positioned in said recess, a tongue disposed between said two hooks, said driver member of the transmission mechanism being rotatable with said tongue, and said core being rotatable with said handle shaft.

3. A reclining angle adjustment device according to claim 2, wherein said transmission mechanism further includes a chain and sprocket with said driver comprising said sprocket.

4. A reclining angle adjustment device according to claim 3, wherein said core is integral with said handle shaft and includes a sprocket shaft angularly movably fitted over said handle shaft, said tongue being integral with said sprocket shaft.

* * * * *